United States Patent
Al-Muraikhi

(10) Patent No.: US 7,303,009 B2
(45) Date of Patent: Dec. 4, 2007

(54) METHOD TO DETECT LOW SALINITY INJECTION WATER ENCROACHMENT INTO OIL FORMATIONS

(75) Inventor: Ahmed J. Al-Muraikhi, Alkhobar (SA)

(73) Assignee: Saudi Arabian Oil Company (SA)

( * ) Notice: Subject to any disclaimer, the term of this patent is extended or adjusted under 35 U.S.C. 154(b) by 216 days.

(21) Appl. No.: 11/324,986

(22) Filed: Jan. 3, 2006

(65) Prior Publication Data

US 2007/0151728 A1   Jul. 5, 2007

(51) Int. Cl.
   *E21B 47/12*   (2006.01)
(52) U.S. Cl. .............. 166/252.3; 166/254.2; 73/152.02
(58) Field of Classification Search ............ None
   See application file for complete search history.

(56) References Cited

U.S. PATENT DOCUMENTS

| | | | |
|---|---|---|---|
| 3,002,091 A | 9/1961 | Armstrong | |
| 4,085,798 A | 4/1978 | Schweitzer et al. | |
| 4,617,517 A * | 10/1986 | Fertl | 324/338 |
| 4,639,596 A | 1/1987 | Tanner, III et al. | |
| 6,747,270 B2 * | 6/2004 | Pereira et al. | 250/269.4 |

OTHER PUBLICATIONS

Al-Saif et al.: "Analysis of Pulsed-Neutro Decay-Time Logs in Acidized Carbonate Formations" SPE 5443, Aug. 14, 1975 pp. 453-466 XP002436167.

Nutt et al.: "Time-Lapse Saturation Monitoring and ITS Applications to Time-Lapse Mapping" SPE 17975, Mar. 11, 1989 through Mar. 14, 1989 pp. 483-494 XP002436168.

* cited by examiner

*Primary Examiner*—Zakiya W. Bates
(74) *Attorney, Agent, or Firm*—Bracewell & Giuliani LLP

(57) ABSTRACT

This invention relates to the field of water flood monitoring in low saline water environment in a subterranean formation. In particular, the method of the invention relates to detecting the encroachment of low salinity water into oil formations. This invention provides the means to gain valuable information about water movement within the oil reservoir.

12 Claims, 1 Drawing Sheet

METHOD TO DETECT LOW SALINITY INJECTION WATER ENCROACHMENT INTO OIL FORMATIONS

BACKGROUND OF THE INVENTION

1. Technical Field of the Invention

This invention relates generally to the field of water flood monitoring in low saline water environment in a subterranean formation. In particular, the method of the invention relates to detecting the encroachment of low salinity water into oil formations. This invention provides the means to gain valuable information about water movement within the oil reservoir.

2. Description of the Prior Art

Knowledge of oil and water saturation behind casing is crucial to mature field management. Saturation changes within the reservoir are an indication of how the oil formation is swept by water injection. By tracking saturation changes, decisions can be made to control rates from different perforation intervals within the producing wellbore for better management of sweep and recovery.

Thermal Decay Time (TDT) and Pulse Neutron Logging (PNL) are common logging techniques used to determine oil and water saturation. When the salinity of the injected water is high, chlorine, which has a large neutron capture cross section, is abundant in the water and can be easily identified with TDT or PNL log. TDT and PNL have been proven to be reliable methods for detection of saline water movement within oil reservoirs.

The Thermal Decay Time log is a record of the rate of capture of thermal neutrons in a portion of formation after it is bombarded with a burst of 14-MeV neutrons. An electronic neutron generator in a tool produces pulses of neutrons which spread into the borehole and formation. The neutrons are quickly slowed down to thermal energies by successive collisions with atomic nuclei of elements in the surrounding media. The thermalized neutrons are gradually captured by elements within the neutron cloud, and, with each capture, gamma rays are emitted. The rate at which these neutrons are captured depends on the nuclear capture cross sections which are characteristic of the elements making up the formation and occupying its pore volume. The gamma rays of capture which are emitted are counted at one or more detectors in the sonde during different time gates following the burst, and from these counts the rate of neutron decay is automatically computed providing information regarding the formation. One of the results typically displayed is the thermal decay time, which is related to the macroscopic capture cross section of the formation, which is also displayed. Because chlorine is by far the strongest neutron absorber of the common earth elements, the response of the tool is determined primarily by the chlorine present (as sodium chloride) in the formation water. Like the resistivity log, therefore, the measured response is sensitive to the salinity and amount of formation water present in the pore volume. The response is relatively unaffected by the usual borehole and casing sizes encountered over pay zones. Consequently, when formation water salinity permits, Thermal Decay Time logging provides a means to recognize the presence of hydrocarbons in formations which have been cased, and to detect changes in water saturation during the production life of the well. When salinity is low, conventional TDT logging is not reliable. In the proper environment, the TDT log is useful for the evaluation of oil wells, for diagnosing production problems, and for monitoring reservoir performance.

In fields where relatively low salinity water is used for enhanced oil recovery, TDT and PNL data will be meaningless. Sigma readings of low saline water and oil are very close, and consequently difficult to differentiate. TDT and PNL cannot be reliably used to detect low saline water displacement of oil. There is a need for a method to provide detection of movement within oil reservoirs for low salinity water.

Carbon/Oxygen Ratio (COR) logging is a technique introduced to the petroleum industry to obtain oil and water saturation independent of water salinity. However, field application of COR has yielded mixed results.

Techniques performed by hydrocarbon producers to increase the net permeability of the reservoir are referred to as "stimulation." Essentially, one can perform a stimulation technique by injecting chemicals into the wellbore to either react with and dissolve portions of the formation, or to create further fissures in the formation. When these methods utilize acids, they are referred to as fracture acidizing (injection of acid at rates above fracture pressure to etch the faces of the resultant fractures) and matrix acidizing (injection of acid at rates below fracture pressure to dissolve flow channels in the rock or to remove scale or damage caused by drilling). Matrix acidization, as described above, is a stimulation method that is known solely for the purpose of productivity enhancement. Acid treatments are employed in all types of oil wells and occasionally in water wells.

Acids useful in such stimulation or acid treatment processes are typically extremely active, such as hydrofluoric acid. Aqueous acid solutions, acid-like fluids or fluid of similar function are commonly used to treat oil or gas wells. These solutions are useful for matrix acidization. Selection of the appropriate acid is made based upon the individual well.

It would be advantageous to provide a means for monitoring low saline water in a subterranean formation. It would be advantageous to also provide a means for such monitoring that is effective for horizontal wells and a method that is effective for vertical wells. It would be particularly advantageous to provide a method for monitoring water sweep in salinity environments when sigma readings as taken by convention thermal decay time and pulse neutron logging methods are very similar between low saline water and oil.

SUMMARY OF THE INVENTION

The current invention relates to the novel use of conventional logging techniques such as Thermal Decay Time (TDT) and Pulse Neutron Logging (PNL) in the low saline water environment and provides one or more of the advantageous identified above. The method of the invention for detecting low salinity encroachment in a hydrocarbon formation around a hydrocarbon-producing well having a hydrocarbon-producing wellbore includes introducing acid into the hydrocarbon-producing wellbore at a pressure substantially lower than that pressure required to fracture the formation. This acidizes the formation. After acidization, primary logging of the formation around the hydrocarbon-producing wellbore is obtained utilizing neutron logging equipment, or other similar conventional logging equipment sensitive to salinity, to establish a baseline reading prior to injection of water. Water is then injected by means of an injector well into the formation after establishing the baseline reading. The injector well preferably intersects the entire reservoir. The acid, which contains an element with a large neutron capture cross section, increases the concentration of the large neutron capture cross section element.

The preferred acid contains chloride. With a chloride-containing acid, acidization changes the chloride concentration around the hydrocarbon-producing well. A secondary logging of the formation is then obtained utilizing neutron logging equipment after the injection of water to establish a post-flood reading. The difference between the baseline reading, also called a sigma baseline, and the post-flood reading establishes a differential. The differential allows the monitoring and identification of low salinity water encroachment. It is expected that secondary logging of the formation will occur repeatedly at intervals.

The method of the invention is useful with vertical wells producing hydrocarbons. The method is also useful when the hydrocarbon-producing well is horizontal well with a horizontal wellbore as well as with highly deviated wells. Various techniques can be used to acidized the horizontal well, including the use of CTU or the use of high pressure pumps without CTU. The hydrocarbon-producing well can be branched and/or can intersect with other wells.

Another preferred embodiment includes a horizontal wellbore and an observation well located such that logging equipment introduced into the observation well is operable to monitor water sweep below the horizontal wellbore. In one preferred embodiment, the acid is introduced into the vertical observation well. The vertical observation well is located such that logging equipment introduced into the observation well is operable to monitor water sweep below the horizontal wellbore. When a vertical observation well is acidized in order to monitor a horizontal well production zone, the horizontal well is not necessarily acidized in addition to the vertical observation well. Certain horizontal wells will benefit from acidization along with the vertical observation well, but others will not.

When operating with a vertical observation well, the primary logging of the formation is obtained utilizing neutron logging equipment to establish a baseline reading after the introduction of the acid prior to injection of water. Water is then injected into the formation through the injector well after establishing the baseline reading. The secondary logging of the formation is then obtained utilizing neutron logging equipment after the injection of water to establish a post-flood reading. The differential between the post-flood reading and the baseline reading is determined and is operable to identify low salinity water encroachment.

The acid can be any acid known in the art useful for acidizing the formation under the given physical conditions. A particularly preferred acid includes hydrochloric acid. This acid is preferably used alone, but can be used in combination with other acids. Preferred acid types include demulsified acid, aqueous acid solutions, acid-like fluids and combinations thereof. In a preferred embodiment, the acid is washed out of the hydrocarbon-producing well after acidization.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

DETAILED DESCRIPTION OF THE INVENTION

Figure 1:
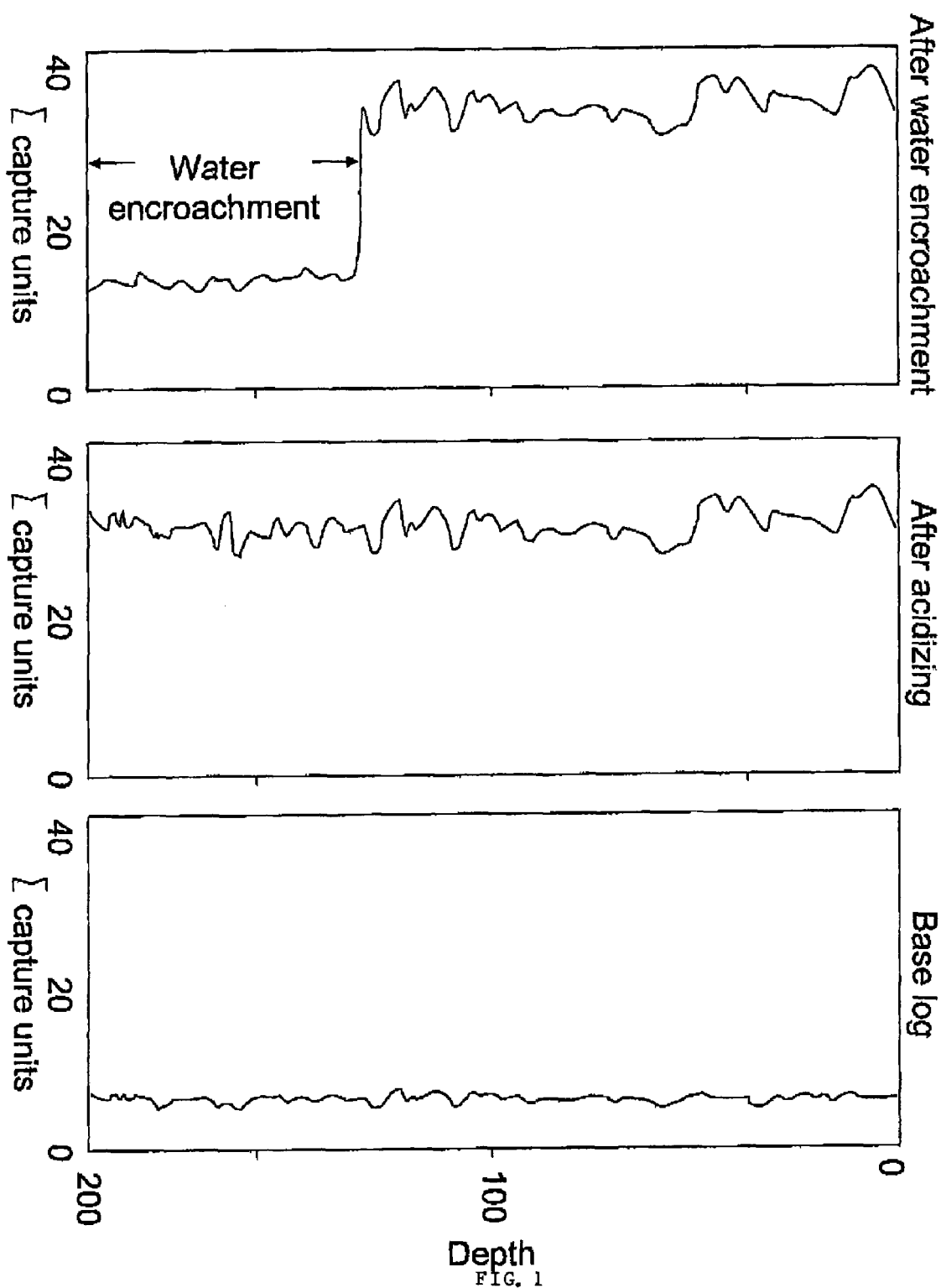
FIG. 1 depicts typical logs useful in a preferred embodiment of the invention.

The method of the invention includes the pre-treating of an existing reservoir with acid to create a high sigma baseline. In one preferred embodiment, a vertical observation branch is used for gathering additional water sweep information. Acidizing of the reservoir is performed in conjunction with, but prior to, convention log-inject-log techniques.

Specifically, the well is first treated with acid. This creates a high sigma reading condition in the formation around the wellbore before low salinity water invasion. This pre-treatment with acid is effective for virtually any production well, even those wells that do not otherwise need stimulation, and for observation wells that are drilled to monitor the water flood front. After acid treatment, TDT and/or PNL is run to record baseline readings. Due to the acid, these readings will be high sigma readings. The acid effect on TDT and PNL readings is advantageously extremely stable, even with long and high rate oil production. The reading is effected when water invades and contacts with the acidized formation. Water dilutes and removes, for example, chloride from the acidized formation. Water is injection through the injector well. After water breakthrough, TDT and/or PNL are run again. The water-swept zones will now show a lower sigma reading as a result. Thus, comparing TDT and PNL logs taken over time will give a qualitative indication of where the low saline water encroachment takes place in the reservoir.

This invention provides the means to gain valuable information about water movement within the oil reservoir.

The technique outlined above can be readily applied to any type of well, including vertical, horizontal, highly-deviated, multi-lateral or Maximum Reservoir Contact (MRC) wells. It is applicable for long horizontal wells also. For horizontal wells, the present invention includes a method to determine reservoir sweep below the horizontal wellbore. The method includes drilling a vertical observation branch in addition to the usual horizontal wellbore. The horizontal wellbore is then used for production and the vertical branch for sweep observation. The vertical branch is drilled, acid treated, and isolated with casing or a packer and a plug. Time-laps TDT and PNL logs on the vertical branch will yield information of how low saline water invasion takes place across all production intervals below the horizontal wellbore. Alternately, conventional horizontal well methods for TDT and PNL logs can be used after acidization. Similarly, other neutron generation methods of logging can be used, such as TMD.

Demulsified acid is one type of acid that is useful in this method for stimulation purposes as it has the property of becoming active upon reaching the appropriate wellbore zone rather that stimulating other parts of the formation. This is particularly useful when the invention is being practiced on a well that otherwise does not benefit from stimulation. Several types of acid formulas can be used in this method, which are known to the art. Generally speaking, acids, or acid-based fluids, are useful in this regard. While in stimulation jobs, acids are chosen depending on the goal of the stimulation job, low saline water detection is not limited to such criteria. An acid can be selected that minimizes stimulation that still provides the appropriate sigma condition for the invention. Alternately, a dual benefit can be acquired by utilizing acid that both stimulates and acts to provide the high sigma condition desired. In order to practice the invention for the dual benefit, logging is performed after acidizing but before water invasion to set the baseline.

The invention includes a new method of logging using acid treatment with completion and logging technologies. For a field where low salinity water is used in water flood, after a well is drilled, the near wellbore regime is treated with acid, regardless of whether stimulation is required or not. The well is then cased and perforated. TDT, PNL and other logging techniques known in the art are then run to establish a baseline reading. During the production life of the well, periodically scheduled TDT and PNL loggings will be run. Water is injected through the injector well. Once low saline water invasion occurs, for the water invaded zones, chloride concentration will be reduced. This will be reflected by a reduction in the sigma reading in the TDT and PNL logs. The progression of water sweep can be easily identified by comparing logs taken over time. Proper steps can then be taken to control water cut, target by-passed oil if identified and prolong well life.

For a horizontal well, in addition to the drilling of the usual horizontal wellbore, a vertical observation wellbore can be drilled for logging and monitoring purpose. Since production is through the horizontal wellbore, the vertical wellbore is drilled, pre-treated, and then cased without perforation. Baseline TDT and PNL logs are run on the vertical wellbore. Water flood movement below the horizontal production wellbore can be observed by running subsequent logs in the vertical wellbore.

The invention includes pre-treatment of the reservoir around the wellbore with acid to make a high sigma baseline condition. For horizontal wells, the invention promotes the drilling, pre-treating of the vertical observation branch for gaining additional water sweep information below the horizontal wellbore.

Currently, TDT and PNL logs cannot be used to differentiate oil and low saline water. Experience with COR log, which is supposed to be independent of water salinity, has been less desirable. In this invention, formations around the wellbore will be pre-treated with acid to create a high chloride concentration environment. As documented in the literature, the effect of acid is permanent as long as there is no water invasion even with long term and high oil rate production. Once the formation is swept by low saline water, the chloride concentration will be decreased. Logging before and after water invasion will be reflected by a reduction in Sigma reading. With pre-treatment, conventional TDT and PNL logs can be run to give a qualitative measure of where the injected water is.

For horizontal wells, current practice of logging the horizontal wellbore cannot provide data on water sweep in the vertical plane. With this invention, a vertical observation branch can be added to gain information about water level movement below the conventional horizontal wellbore.

This invention advantageously addresses the two issues: 1) how to reliably identify low saline water invasion with conventional TDT and PNL logs; 2) for horizontal wells, how to accurately monitor water sweep below the wellbore. The invention addresses the first issue that is relative to lack of contrast in log responses between oil and low saline water. TDT and PNL logs are difficult to interpret in low saline environments using traditional methods. By acidizing, the contrast is heightened creating reliable means to identify the water front.

For horizontal wells, logging can be conducted in the horizontal wellbore. Acidizing according to the invention is performed by conventional methods. TDT and PNL logs are then run. However, horizontal logging does not provide a picture about water sweep across the entire reservoir below the horizontal wellbore. Reservoir heterogeneity and water coning can result in oil trapped below watered out zones. In this situation, vertical observation branches can be used.

This invention overcomes the existing logging difficulty by proposing pre-treatment of oil formation with acid to establish a high sigma reading environment. This leads to chloride concentration contrast to be developed as low saline water invades the oil formation. As a result, conventional logging methods such as TDT and PNL can then be utilized for fields using low saline water injection as an EOR method.

In one embodiment of the current invention, vertical observation branches are used for horizontal wells. This concept allows water flood to be accurately monitored below the horizontal wellbores.

Cost effective and reliable methods are required in reservoir management to determine low saline water sweep. This invention contributes directly to that effort.

Matrix acidizing is accomplished by pumping acid through the wellhead into the wellbore and allowing the acid to penetrate through the formation of the wellbore for a predefined distance or for a predefined amount of time. An example would be to allow the acid to penetrate a few feet through the formation. This is often followed by washing out the acid. The acid is deployed through means known in the art.

While the invention has been shown or described in only some of its forms, it should be apparent to those skilled in the art that it is not so limited, but is susceptible to various changes without departing from the scope of the invention.

I claim:

1. A method for detecting low salinity encroachment in a hydrocarbon formation around a hydrocarbon-producing well, the hydrocarbon-producing well including a hydrocarbon-producing wellbore, the process comprising the steps of:
    introducing acid into the hydrocarbon-producing wellbore at a pressure substantially lower than that pressure required to fracture the formation,
    obtaining primary logging of the formation utilizing neutron logging equipment to establish a baseline reading after the introduction of the acid prior to injection of water;
    injecting water into the formation through an injector well after establishing the baseline reading;
    obtaining secondary logging of the formation utilizing neutron logging equipment after the injection of water to establish a post-flood reading,
    identifying of differential between the post-flood reading and the baseline reading such that the differential is operable to identify low salinity water encroachment.

2. The process of claim 1 wherein the hydrocarbon-producing well is a vertical well.

3. The process of claim 1 wherein the hydrocarbon-producing well is a horizontal well with a horizontal wellbore.

4. The process of claim 3 wherein the acid is introduced into the wellbore through the use of a high pressure pump.

5. The process of claim 3 further comprising an observation well located such that logging equipment introduced into the observation well is operable to monitor water sweep below the horizontal wellbore.

6. The process of claim 1 wherein the acid comprises hydrochloric acid.

7. The process of claim 1 wherein the acid type is selected from the group consisting of demulsified acid, aqueous acid solutions, acid-like fluids and combinations thereof.

8. The process of claim 1 further comprising the step of washing out the acid producing the hydrocarbon from the well.

9. A method for detecting low salinity encroachment in a hydrocarbon formation around a horizontal hydrocarbon-producing well, the horizontal hydrocarbon-producing well including a horizontal hydrocarbon-producing wellbore, the process comprising the steps of:

introducing acid into a vertical observation well, the vertical observation well being located such that logging equipment introduced into the observation well is operable to monitor water sweep below the horizontal wellbore, obtaining primary logging of the formation utilizing neutron logging equipment to establish a baseline reading after the introduction of the acid prior to injection of water;

injecting water into the formation through an injector well after establishing the baseline reading;

obtaining secondary logging of the formation utilizing neutron logging equipment after the injection of water to establish a post-flood reading, identifying differential between the post-flood reading and the baseline reading such that the differential is operable to identify low salinity water encroachment.

10. The process of claim 9 wherein the acid comprises hydrochloric acid.

11. The process of claim 9 wherein the acid type is selected from the group consisting of demulsified acid, aqueous acid solutions, acid-like fluids and combinations thereof.

12. The process of claim 9 further comprising the step of washing out the acid producing the hydrocarbon from the well.

* * * * *